US010323530B2

(12) United States Patent
De La Bruere Terreault

(10) Patent No.: US 10,323,530 B2
(45) Date of Patent: Jun. 18, 2019

(54) TANDEM MAGNETIC SEAL WITH SINGLE MAGNET

(71) Applicant: PRATT & WHITNEY CANADA CORP., Longueuil (CA)

(72) Inventor: Julien De La Bruere Terreault, Ste-Anne-de-Sorel (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 596 days.

(21) Appl. No.: 15/056,354

(22) Filed: Feb. 29, 2016

(65) Prior Publication Data
US 2017/0248026 A1  Aug. 31, 2017

(51) Int. Cl.
*F01D 11/00* (2006.01)
*F16J 15/34* (2006.01)

(52) U.S. Cl.
CPC ......... *F01D 11/003* (2013.01); *F16J 15/3444* (2013.01); *F05D 2300/507* (2013.01)

(58) Field of Classification Search
CPC ...... F01D 11/00; F01D 11/003; F01D 11/005; F16J 15/162; F16J 15/3444; F16J 15/43; F05D 2300/507; F16C 33/765; H02K 49/106
USPC .......................................................... 60/805
See application file for complete search history.

(56) References Cited

U.S. PATENT DOCUMENTS

| 5,165,701 | A | 11/1992 | Koba |
| 5,704,613 | A | 1/1998 | Holtkamp |
| 5,865,441 | A | 2/1999 | Orlowski |
| 2008/0106042 | A1* | 5/2008 | Roddis ............... F16J 15/441 277/399 |
| 2011/0215533 | A1 | 9/2011 | Li et al. |
| 2014/0154053 | A1* | 6/2014 | Roberts ............... F01D 11/00 415/121.3 |

FOREIGN PATENT DOCUMENTS

EP          0018791 B1    4/1980

* cited by examiner

*Primary Examiner* — Phutthiwat Wongwian
*Assistant Examiner* — Loren C Edwards
(74) *Attorney, Agent, or Firm* — Norton Rose Fulbright Canada LLP

(57) ABSTRACT

A magnetic seal system adapted for use within a support structure mounted around a rotatable shaft. The magnetic seal system includes two annular seal assemblies configured to be surrounding the shaft to rotate therewith and be axially displaceable along the shaft. Each annular seal assembly includes an annular member adjacent to an annular seal. The magnetic seal system also includes an annular magnet configured to be sealingly connected to the support structure and surrounding the shaft The magnet being disposed between the two annular seals in a non-contacting relationship with the shaft and biasing the two annular members along the shaft towards the magnet, wherein adjacent contacting surfaces between each of the two annular seals and the magnet biasingly mate to form sealing interfaces.

13 Claims, 2 Drawing Sheets

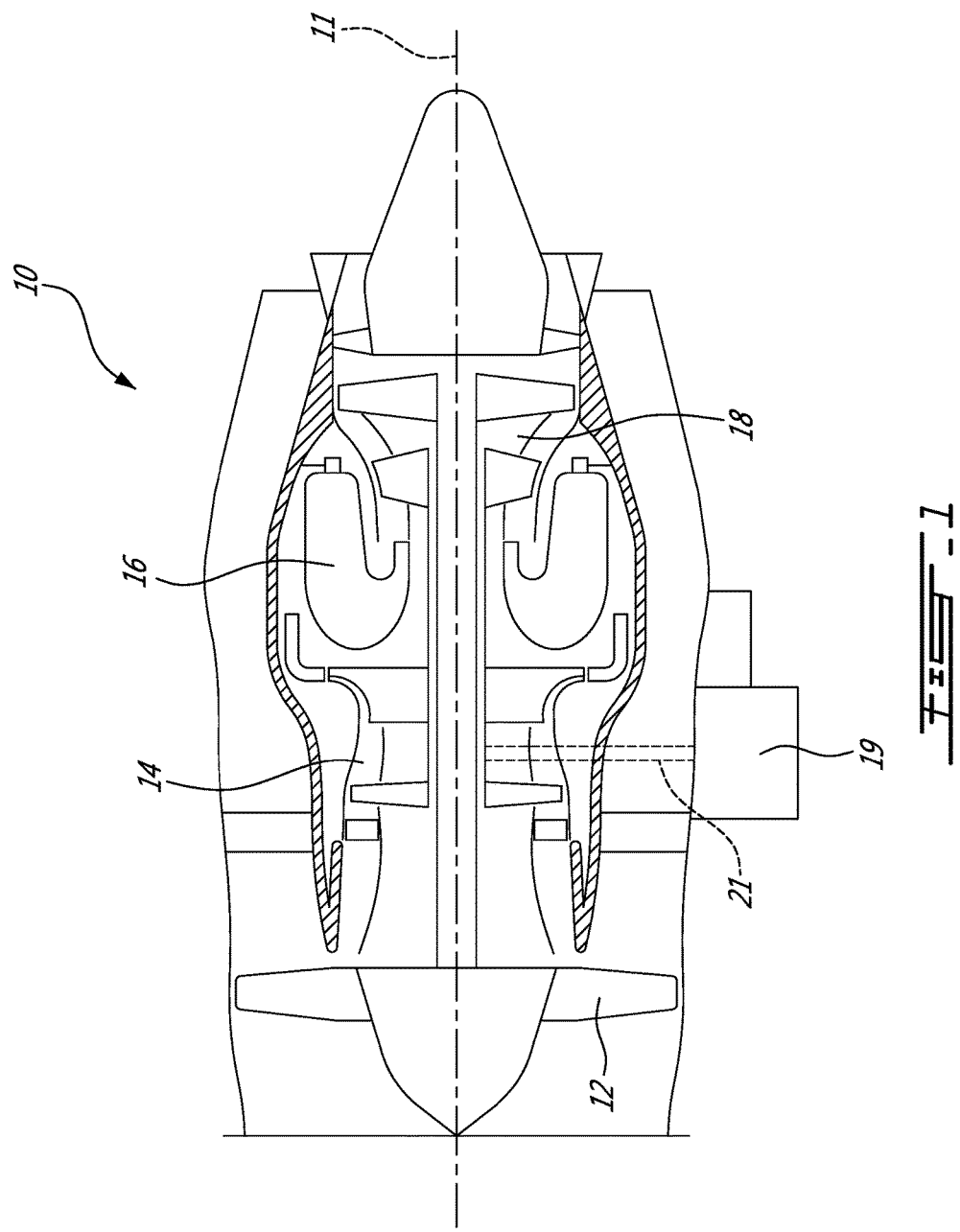

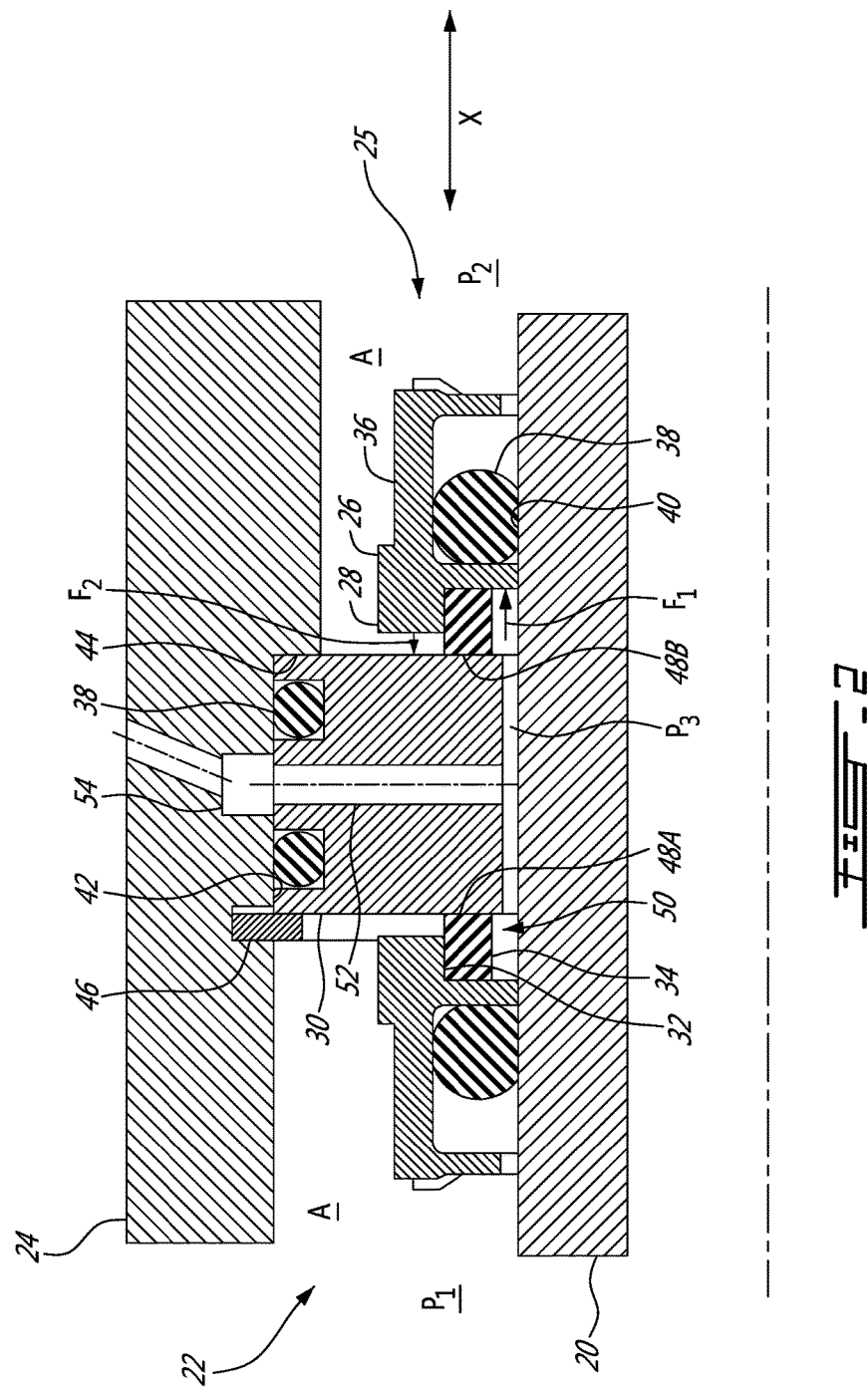

TANDEM MAGNETIC SEAL WITH SINGLE MAGNET

TECHNICAL FIELD

The application relates generally to magnetic seals of the type used to seal a rotating shaft and, more particularly, to a magnetic seal with a single magnet.

BACKGROUND OF THE ART

Magnetic seals typically use magnetic attraction between a static magnet and a rotating metallic mating ring. A carbon ring is usually inserted between the magnet and the metallic mating ring. The carbon ring rotates with the metallic mating ring. The magnetic attraction forms a dynamic seal at the interface between the rotating carbon ring and the static magnet to prevent the passage of fluid through the dynamic seal. Although multiple magnets and corresponding metallic mating rings can be used, this can require additional space while increasing cost and weight. Room for improvement exists.

SUMMARY

In one aspect, there is provided a magnetic seal system adapted for use within a support structure mounted around a rotatable shaft, the magnetic seal system comprising two annular seal assemblies configured to be surrounding the shaft to rotate therewith and axially displaceable along the shaft, each annular seal assembly includes an annular member adjacent to an annular seal; and an annular magnet configured to be sealingly connected to the support structure and surrounding the shaft, the magnet being disposed between the two annular seals in a non-contacting relationship with the shaft, the magnet biasing the two annular members along the shaft towards the magnet, wherein adjacent contacting surfaces between each of the two annular seals and the magnet biasingly mate to form sealing interfaces.

In another aspect, there is provided an engine assembly comprising an engine core including at least one internal combustion engine; a rotatable shaft operatively engaged with the engine core; a support structure mounted around the shaft, the support structure housing at least a section of the shaft; and a magnetic seal system disposed within the support structure and mounted around the rotatable shaft, the magnetic seal system including two annular seal assemblies surrounding the shaft to rotate therewith and axially displaceable along the shaft, each annular seal assembly includes an annular member adjacent to an annular seal; and an annular magnet sealingly connected to the support structure and surrounding the shaft, the magnet being disposed between the two annular seals in a non-contacting relationship with the shaft, the magnet biasing the two annular members along the shaft towards the magnet, wherein adjacent contacting surfaces between each of the two annular seals and the magnet biasingly mate to form sealing interfaces.

In a further aspect, there is provided a method of magnetically sealing a space surrounding a rotatable shaft mounted within a support structure, the method comprising the steps of magnetically and concurrently biasing two annular members surrounding the shaft towards an annular magnet mounted between the two annular members; positioning an annular seal between each one of the two annular members and the magnet; and sealing adjacent contacting surfaces between each annular seal and the magnet, thereby forming sealing interfaces.

DESCRIPTION OF THE DRAWINGS

Reference is now made to the accompanying figures in which:

FIG. 1 is a schematic cross-sectional view of a turbofan gas turbine engine; and FIG. 2 is a schematic sectional view of a magnetic seal system in accordance with an embodiment of the present disclosure.

DETAILED DESCRIPTION

FIG. 1 illustrates a turbofan gas turbine engine 10 of a type preferably provided for use in subsonic flight, generally comprising in serial flow communication, along a longitudinal axis 11, a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. An accessory gearbox 19 may be driven by either one of the compressor 14 and the turbine section 18. In the embodiment shown, the gearbox is driven by a shaft 21 operatively engaged with the engine.

Referring to FIG. 2, a magnetic seal system in accordance with the present disclosure is generally shown at 22, for instance of the type used in the accessory gearbox 19 of the gas turbine engine 10. The magnetic seal system 22 can be used to seal a space A between a shaft 20 and a support structure 24 mounted around the shaft 20 to block or prevent fluid passage through the space A. In the illustrated embodiment, the space A is an annular space. The support structure 24 can be any rigid housing or casing surrounding the shaft 20 and enclosing the space A. In a particular embodiment, the support structure 24 houses a section or a portion of the shaft 20. Alternately, the support structure 24 substantially houses the shaft 20. The magnetic seal system 22 can also be used as an output shaft or a propeller shaft seal. Other possible rotating shafts may include, but are not limited to, one or more electrical generator(s) rotor(s), accessories, or any other type of shaft or combination thereof. Other uses include output shaft seal on a turboshaft and in turboprop engines, and use as bearing cavity seals for engine mainshafts.

The space A can be located between an external ambient pressure P1 and an interior pressure P2, for example pressure within the gearbox 19 (FIG. 1). Alternately, the space A can be located between any two enclosures having different pressures P1 and P2 and/or that can be pressurized at different pressures during the operation of the engine 10. Therefore, it may be desirable to seal the space A to prevent the passage of fluid therethrough.

The magnetic seal system 22 includes two or more annular seal assemblies 25. In the embodiment shown, the magnetic seal system includes two annular seal assemblies 25. To avoid an unnecessary duplication of reference numerals in FIG. 2, the enumeration of components of the annular seal assemblies 25 may be featured on either one but not necessarily on both of annular seal assemblies 25. Each annular seal assembly 25 includes an annular member 26 adjacent to an annular seal 34. The annular members 26 typically consist of a structurally rigid material, such as a metal, with a ferromagnetic content. Each annular member 26 surrounds the shaft 20 and rotates therewith. The annular members 26 are free to move along the shaft 20 in axial direction X if sufficient force is applied thereon.

In the embodiment shown, each annular member 26 may include a first protrusion 28 extending from the annular member 26 in a direction towards a single annular magnet 30. The first protrusion 28 defines a seat 32 for housing the annular seal 34 and to strengthen the connection between the annular seal 34 and the annular member 26. Each annular seal 34 may be partially surrounded by the seat 32 of the first protrusion 28. In the embodiment shown, each seat 32 radially surrounds a portion of the annular seal 34. Alternately, the seat 32 may substantially surround the annular seal 34. Each annular member 26 may also feature an annular cavity 36 for housing a sealing ring 38, such as an O-ring, to provide sealing interfaces 40 between the shaft 20 and each annular member 26. It can be by way of the sealing ring 38 that the annular members 26 are retained in rotation on the shaft 20, yet are capable of moving in translation.

The annular magnet 30 is mounted in a non-contacting relationship relative to the shaft 20 and is sealingly connected to an inner face 42 of the support structure 24. In the particular arrangement of FIG. 2, with the annular magnet 30 being positioned between the annular members 26, the annular magnet 30 exerts an attracting force on both the annular members 26, such that the annular members 26 are drawn toward the annular magnet 30. Although the annular magnet 30 is illustrated as a single monolithic magnet, numerous other arrangements are considered. For example, the annular magnet 30 may be constituted of a non-magnetic annular body supporting a plurality of discrete magnets, among other possibilities. The expression "annular magnet 30" encompasses this arrangement of discrete magnets in a support body, along with other arrangements.

In the embodiment shown, the support structure 24 may define an abutment seat 44 against which the annular magnet 30 may be abutted. A locking ring 46 may be used to block the annular magnet 30 in the axial direction X. Alternately, other locking mechanism may be used to block the annular magnet 30, such as threaded sleeve engaged against the inner face 42. In addition, two sealing rings 38, such as O-rings, are also provided to seal the interface between the annular magnet 30 and the support structure 24.

The magnetic seal system 22 includes two or more annular seals 34 surrounding the shaft 20. In the embodiment shown, two annular seals 34 are provided. Each annular seal 34 is sandwiched between one annular member 26 and the annular magnet 30 to form part of a dynamic sealing interface of the magnetic seal system 22. Adjacent contacting surfaces between each annular seal 34 and the annular magnet 30 form two dynamic sealing interfaces 48A, 48B within the space A. The annular seals 34 rotate with the annular members 26 and the shaft 20, and rub against the stationary annular magnet 30. The annular seal 34 is made of a material that allows maintaining the dynamic sealing interface while rubbing and wearing against the annular magnet 30. For example, the annular seal 34 is made of carbon, or the like. The annular seals 34 are kept in contact with the annular magnet 30 by the attracting force of the magnet 30 on the annular members 26.

In the embodiment shown, a cavity 50 is defined by the shaft 20, the annular magnet 30, the two annular seals 34 and the two annular members 26. Alternately, the cavity 50 may be defined between the shaft 20, the annular magnet 30 and the two annular seals 34. In this alternative embodiment, the annular seals 34 are mounted in abutment to the shaft 20 with due consideration to structural integrity. The cavity 50 is located between the two enclosures formed along the space A and may be referred to as a buffer cavity.

In the embodiment shown, the engine 10 includes a pressurized fluid source (not shown) providing a pressurized fluid into the cavity 50. The pressurized fluid applies a pressure P3 inside of the cavity 50 greater than surrounding pressures P1, P2 of the respective enclosures surrounding the cavity 50. Therefore, in case of leakage through the sealing interfaces 48A, 48B, the fluid inside of the cavity 50 will flow towards the surrounding enclosures, thereby preventing the passage of fluid along the space A between the two enclosures. The pressure P3 inside the cavity 50 can be adjusted by regulating the flowrate of pressurized fluid provided to the cavity 50. In the embodiment shown, the pressurized fluid is introduced through the annular magnet 30. Alternately, the pressurized fluid may be introduced through the shaft 20 or through any other appropriate connection(s).

The pressure P3 inside the cavity 50 may also be controlled to maintain a pressurizing force F1 acting on each annular member 26 lower than an opposite magnetic force F2 present between each of the two members 26 and the annular magnet 30. The magnetic force F2 forces each of the annular member 26 to displace the corresponding annular seal 34 into a mating configuration with the annular magnet 30 and to form the sealing interfaces 48A, 48B. Therefore, the pressurizing force F1 is controlled, through pressurization or depressurization of the cavity 50 for example, in order to maintain the pressurizing force F1 below the magnetic forces F2.

Still referring to FIG. 2, the annular magnet 30 includes a fluid duct 52 communicating with the cavity 50. The fluid duct 52 is a through-hole located at the center of the annular magnet 30. Alternately, other fluid duct configurations may be used. The fluid duct 52 communicates with an outlet port 54 of the support structure 24 which is in fluid communication with the pressurized fluid source. Alternately, the shaft 20 may include a fluid duct communicating with the cavity 50 and in fluid communication with the pressurized fluid source.

In operation, the annular magnet 30 attracts the two annular members 26 towards the annular magnet 30 through magnetic force. The attraction force biases the annular seals 34 located between the annular members 26 and the annular magnet 30 towards and against the annular magnet 30 thereby forming the two sealing interfaces 48A, 48B. A pressurized fluid may be introduced in the cavity 50 to increase the pressure P3 within the cavity 50 above the pressures P1, P2 located in the surrounding enclosures while maintaining the pressurizing force F1 acting on each annular member 26 lower than the opposite magnetic force F2 present between each of the two members 26 and the annular magnet 30. As the shaft 20 rotates, the annular members 26 and annular seals 34 rotate therewith. The annular seals 34 rub against the annular magnet 30 which may cause releasing heat from the friction between the stationary annular magnet 30 and the rotating annular seals 34. The heat may then be dissipated through the annular magnet 30 and/or the annular seals 34 to the surrounding environment. In an alternative embodiment, the annular magnet 30 includes a cooling fluid passage (not shown) for cooling the annular magnet 30. A cooling fluid, such as oil, can be circulated inside the cooling fluid passage.

Accordingly, in a particular embodiment, the magnetic seal system 22 is used for magnetically sealing the space A surrounding the rotatable shaft 20 by magnetically and concurrently biasing the two annular members 26 surrounding the shaft 20 towards the annular magnet 30 during a rotation of the shaft 20, sandwiching the annular seals 34 between each annular member 26 and the annular magnet 30, and sealing adjacent contacting surfaces formed between each annular seal 34 and the annular magnet 30, thereby forming the sealing interfaces 48A, 48B. In a particular embodiment, sealing the space A also includes providing a pressurized fluid and pressurizing a cavity 50 located between the two annular members 26 with the pressurized fluid. In another particular embodiment, the pressurization is accomplished by applying the pressure P3 inside of the cavity which is greater than the pressures P1, P2 inside the enclosures surrounding the cavity 50. In yet another particular embodiment, the steps include cooling the magnet using a cooling fluid. In yet another particular embodiment, the steps include pressurizing, or depressurizing, the cavity 50 with the pressurized fluid to maintain the pressurizing force F1 acting on each annular member 26 lower than the opposite magnetic force F2 present between each of the two members 26 and the annular magnet 30. Maintaining the pressurizing force F1 lower than the opposite magnetic force F2 is advantageous for contacting the surfaces between each annular seal 34 and the annular magnet 30 to form the two dynamic sealing interfaces 48A, 48B.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A magnetic seal system adapted for use within a support structure mounted around a rotatable shaft, the magnetic seal system comprising:
two annular seal assemblies configured to be surrounding the shaft to rotate therewith and axially displaceable along the shaft, each annular seal assembly includes an annular member adjacent to an annular seal; and
an annular magnet surrounding the shaft and configured to be sealingly connected to the support structure, the magnet being disposed between the two annular seals in a non-contacting relationship with the shaft, the magnet biasing the two annular members along the shaft towards the magnet, wherein adjacent contacting surfaces between each of the two annular seals and the magnet biasingly mate to form sealing interfaces, a cavity defined by at least the shaft, the magnet, and the two annular seal assemblies, the cavity being configured to receive a pressurized fluid applying a pressure inside the cavity that is greater than pressures surrounding the cavity.

2. The magnetic seal system as defined in claim 1, wherein at least one of the two annular members faces the magnet and further comprises a protrusion extending from the at least one of the two annular members in a direction towards the magnet and defining a seat at least partially surrounding a corresponding one of the two annular seals.

3. The magnetic seal system as defined in claim 1, wherein the magnet includes a fluid duct communicating with the cavity and adapted to be in fluid communication with a fluid source providing the pressurized fluid.

4. The magnetic seal system as defined in claim 1, further comprising at least two sealing rings sealingly surrounding the shaft, each sealing ring being mounted adjacent to one of the at least two annular members.

5. An engine assembly comprising:
an engine core including at least one internal combustion engine;
a rotatable shaft operatively engaged with the engine core;
a support structure mounted around the shaft, the support structure housing at least a section of the shaft; and
a magnetic seal system disposed within the support structure and mounted around the rotatable shaft, the magnetic seal system including:
two annular seal assemblies surrounding the shaft to rotate therewith and axially displaceable along the shaft, each annular seal assembly includes an annular member adjacent to an annular seal; and
an annular magnet surrounding the shaft and sealingly connected to the support structure, the magnet being disposed between the two annular seals in a non-contacting relationship with the shaft, the magnet biasing the two annular members along the shaft towards the magnet, wherein adjacent contacting surfaces between each of the two annular seals and the magnet biasingly mate to form sealing interfaces, a cavity defined by at least the shaft, the magnet, and the two annular seal assemblies, the engine core includes a pressurized fluid source providing a pressurized fluid into the cavity, the pressurized fluid applying a pressure inside the cavity that is greater than a pressure surrounding the cavity.

6. The engine assembly as defined in claim 5, wherein the magnet includes a fluid duct communicating with the cavity and in fluid communication with the pressurized fluid source.

7. The engine assembly as defined in claim 6, wherein the support structure includes an outlet port communicating with the fluid duct and in fluid communication with the pressurized fluid source.

8. The engine assembly as defined in claim 5, wherein the shaft includes a fluid duct communicating with the cavity and in fluid communication with the pressurized fluid source.

9. A method of magnetically sealing a space surrounding a rotatable shaft mounted within a support structure, the method comprising the steps of:
magnetically and concurrently biasing two annular members surrounding the shaft towards an annular magnet mounted between the two annular members;
positioning an annular seal between each one of the two annular members and the magnet;
sealing adjacent contacting surfaces between each annular seal and the magnet, thereby forming sealing interfaces; and
pressurizing a cavity disposed between the two annular seals with a pressurized fluid, wherein a pressure inside of the cavity is greater than pressures surrounding the cavity.

10. The method as defined in claim 9, comprising pressurizing a cavity disposed between the two annular members with a pressurized fluid, wherein a resulting pressurizing force on each one of the two annular members is lower than an opposite magnetic force present between each one of the two annular members and the annular magnet.

11. The method as defined in claim 9, comprising pressurizing a cavity disposed between the two annular seals, wherein a pressure inside of the cavity is greater than pressures surrounding the cavity and, wherein a resulting pressurizing force on each one of the two annular members is lower than an opposite magnetic force present between each one of the two annular members and the annular magnet.

12. The method as defined in claim 9, comprising cooling the magnet using a cooling fluid.

13. The method as defined in claim 9, comprising cooling the magnet using the pressurized fluid.

\* \* \* \* \*